(12) United States Patent
Stewart et al.

(10) Patent No.: US 6,389,112 B1
(45) Date of Patent: May 14, 2002

(54) METHOD AND APPARATUS FOR ON-LINE MONITORING OF TELECOMMUNICATION NETWORK SWITCHES

(75) Inventors: David Stewart, Frisco; Todd Simonsen, Wylie; Michael R. Buckalew, Celina, all of TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/074,209

(22) Filed: May 7, 1998

Related U.S. Application Data

(60) Provisional application No. 60/045,898, filed on May 7, 1997.

(51) Int. Cl.[7] ............................................... H04M 1/24
(52) U.S. Cl. ................. 379/29.09; 379/29.1; 379/1.01; 379/9.04; 379/32.01; 379/29.01
(58) Field of Search ...................... 379/1, 9, 10, 34, 379/29, 24, 14, 15, 27, 113, 112, 111, 133, 134, 266, 265, 309, 11, 13, 201, 29.09, 29.1, 1.01, 9.04

(56) References Cited

U.S. PATENT DOCUMENTS

| | | | | |
|---|---|---|---|---|
| 5,335,268 A | * | 8/1994 | Kelly, Jr. et al. | 379/112 |
| 5,528,661 A | * | 6/1996 | Siu et al. | 379/27 |
| 5,623,540 A | * | 4/1997 | Morrison et al. | 379/115 |
| 5,787,160 A | * | 7/1998 | Chaney et al. | 379/220 |
| 5,799,072 A | * | 8/1998 | Vulcan et al. | 379/114 |
| 5,825,769 A | * | 10/1998 | O'Reilly et al. | 379/112 |
| 5,835,566 A | * | 11/1998 | Cowgill | 379/10 |
| 5,850,426 A | * | 12/1998 | Watkins et al. | 379/29 |
| 5,937,042 A | * | 8/1999 | Sofman | 379/113 |
| 5,940,471 A | * | 8/1999 | Homayoun | 379/34 |
| 6,011,838 A | * | 1/2000 | Cox | 379/113 |
| 6,118,936 A | * | 9/2000 | Lauer et al. | 379/14 |

* cited by examiner

Primary Examiner—Curtis Kuntz
Assistant Examiner—Rexford Barnie
(74) Attorney, Agent, or Firm—Haynes and Boone, LLP

(57) ABSTRACT

Method and apparatus for on-line monitoring of a telecommunications network comprised of first and second switches. Data is collected at each of the first and second switches and transferred to a central data processing unit. The collected data for each one of the first and second switches is arranged, at the switch, into a first data subset containing log information for each one of the first and second switches, a second data subset containing configuration data for each one of the first and second switches and a third data subset containing operational management information for each one of the first and second switches. The arranged data is then transferred to the central data processing unit where first and second evaluations of operating conditions for the telecommunications network are generated therefrom. The first evaluation is a network log count produced from the first data subset for the first and second switches while the second evaluation is a call processing-based evaluation produced from the second and third data subsets for the first and second switches. The collected data for the first and second switches, as well as the first and second evaluations of the telecommunications network, is then reviewed from a remote location over the internet.

12 Claims, 8 Drawing Sheets

CALL PROCESSING PERFORMANCE REPORT
SITE 000                                      DATE: 970101

TRAFFIC DATA

| TRAFFIC INDICATORS | Data | Status | Notes |
|---|---|---|---|
| Call Connection Rate | 95.40% | Yellow | |
| Call Failure Rate | 1 every 99 calls | Green | |
| Total Call Attempts | 640195 | | |

CALL IMPACTING EVENTS

| Section A - Customer Controlled | Per 10K | Status | Notes |
|---|---|---|---|
| 1. Ineffective Dialing Attempts | 367.58 | Yellow | |

| Section B - SWITCH ACCESSIBILITY | Per 10K | Status | Notes |
|---|---|---|---|
| 1. Hardware network Blockage | 0.00 | Green | |
| 2. Switching Equipment Failure (Software) | 0.00 | Green | |
| 3. Provisioned Resource Shortage | 0.00 | Green | |
| 4. Calls Cutoff Due to DTC, NET | 0.00 | Green | |
| 5. Calls Blocked / Cutoff Due to Restarts | 0.00 | Green | |

| Section C - TRANSLATIONS & ROUTING | Per 10K | Status | Notes |
|---|---|---|---|
| 1. Customer Unauthorized Access Denial | 10.53 | Green | |
| 2. Feature Related Access Denial | 0.03 | Yellow | |
| 3. Routing Exceptions | 71.88 | Yellow | |
| 4. No Terminating Resources Available | 10.79 | Green | |

| Section D - DATA QUALITY | Per 10K | Status | Notes |
|---|---|---|---|
| 1. Switch Integrity Errors | 0.00 | Green | |
| 2. DSI Carrier Slips / Loss of Frame | 109.64 | Red | |

| Section E - FACILITY / NETWORK | Per 10K | Status | Notes |
|---|---|---|---|
| 1. PTS Outpulsing Failures (1st Attempt) | 0.34 | Green | |
| 2. PTS Outpulsing Failures (Route Advance) | 0.00 | Green | |
| 3. SS7 Terminating Call Failures | 33.65 | Red | |
| 4. SS7 Continuity Test Failure Rate | 0.34 | Yellow | |
| 5. SS7 Unavailable Routeset Usage | 0.00 | Green | |
| 6. DSI Carrier Unavailable Usage | 133.58 | Red | |

FIG. 8

METHOD AND APPARATUS FOR ON-LINE MONITORING OF TELECOMMUNICATION NETWORK SWITCHES

CROSS-REFERENCE TO RELATED PROVISIONAL APPLICATION

This application claims the benefit of U.S. Provisional Patent Application Serial No. 60/045,898, filed May 7, 1997.

TECHNICAL FIELD

The invention relates generally to telecommunication networks and, more particularly, to a method and apparatus for internet accessible, on-line monitoring of a telecommunication network on a network or switch basis.

BACKGROUND OF THE INVENTION

A telecommunication network, for example, the public switched telephone network (or "PSTN") is comprised of a variety of components. These include voice and/or data terminals used by individuals to access the telecommunication network, local exchange carriers (or "LECs") which couple the terminals to the telecommunications network and switches which route telephone calls and other exchanges between the LECs. Some of the switches commercially available include the DMS-100, DMS-200, DMS-250, DMS-300, DMS-500, DMS-STP, DMS-CDMA and DMS-MTX, all of which are manufactured by Northern Telecom Ltd. of Montreal, Canada. Once purchased from a manufacturer and installed as part of a telecommunication network, a switch is typically operated by an interexchange carrier (or "IXC") service provider such as Sprint or MCI.

As is well appreciated in the art, switches are extremely complex devices which incorporate therein a multitude of hardware components and software modules. To enable either the manufacturer or the IXC service provider to monitor their operation, switches are typically provided with the ability to internally collect various types of information, commonly referred to as "logs", regarding its operation. The information collected by the switch could then be analyzed, for example, by a field technician, to identify problems occurring during operation of tube switch. For a variety of reasons, however, the information collected by the switch has been infrequently used by IXC service providers. One reason is that, oftentimes, the information collected at the switch was only locally available. Thus, in order to examine the collected information, the IXC service provider would have to physically travel to the switch. This has been seen as a great inconvenience, particularly to IXC service providers who operate switches at a number of widely separated geographical locations. Furthermore, as purchasers of switches manufactured by others, some IXC service providers fail to develop a full understanding of the operation of the switch. As a result, therefore, some IXC service providers lacked a full understand of how to best exploit the information collected by the switch. Finally, detailed knowledge regarding certain aspects of switches is sometimes deemed to be proprietary information of the manufacturer thereof. Generally, information deemed by the manufacturer to be proprietary was rarely shared with the IXC service provider purchasing the switch. Again, the result was that some IXC service providers lacked sufficient familiarity with the operation of the switch to fully exploit the information collected thereby.

SUMMARY OF THE INVENTION

In one embodiment, the present invention is of a method for monitoring operation of a telecommunications network which includes a first switch. In this embodiment, data is collected at the switch and transferred to a central data processing unit. The collected data may then be reviewed from a remote location. In one aspect thereof, the central unit generates, from the collected data, an evaluation of operating conditions at the switch. Like the collected data, the evaluation of operating conditions may be evaluated from the remote location. In another aspect thereof, the telecommunications network includes at least two switches. In this aspect, data is collected at each of the switches and transferred to the central data processing unit. A switch of the telecommunications network is selected for reviewed and the collected data for the selected switch is reviewed. In another aspect thereof, an evaluation of each switch is generated and reviewed from the remote location.

In another embodiment, the present invention is of a method for on-line monitoring of a telecommunications network comprised of a first switch and a second switch by collecting data at each one of the first and second switches and transferring the collected data to a central data processing unit. At the central processing unit, the collected data for each one of the first and second switches is arranged into a first data subset containing log information for each one of the first and second switches, a second data subset containing configuration data for each one of the first and second switches and a third data subset containing operational management information for each one of the first and second switches. The arranged data for the first and second switches is then reviewed from a remote location over the internet.

In further aspects thereof, first and/or second evaluation of the telecommunications network is generated from the collected data for the first and second switches. The first and/or the second evaluation of the telecommunications network can also be reviewed from a remote location over the internet. Preferably, the first evaluation is a network log count produced from the first data subset for the first and second switches while the second evaluation is a call processing-based evaluation produced from the second and third data subsets for the first and second switches.

In still another embodiment, the present invention is of a telecommunications network comprised of a first switch, a second switch coupled to said first switch and a central data processing unit coupled to the first and second switches. The central data processing unit includes a first software module for capturing data from each of said first and second switches and a second software module for generating first and second evaluations of said network. Each of the first and second evaluations of the network are accessible for review by an accessing processor positioned at a remote location relative to the central data processing unit and coupled thereto by an Internet connection. In a further aspect thereof, the central data processing unit further includes a third software module for issuing notifications related to said first and second evaluations of said network to designated recipients.

In further aspects thereof, each of the first and second switches include a first software module for collecting log data, a second software module for collecting call processing data and a memory subsystem coupled to the first and second software modules. Preferably, the memory subsystem is arranged to include a first memory area for maintaining log information for the switch, a second memory area for maintaining configuration data for the switch and a third memory area for maintaining operational management information for the switch. In still other aspects thereof, the central data processing unit includes a memory subsystem coupled to the first and second software modules. Preferably, the memory subsystem is arranged to include a first memory area for maintaining raw data for each one of the first and second switches, a second memory area for maintaining processed data for each one of the first and second switches and a third memory area for maintaining processed data for the telecommunications network.

BRIEF DESCRIPTION OF THE DRAWINGS

FIG. 8 is a graphical illustration of a call processing ("CP") based evaluation of the health of the telecommunications network of FIG. 1.

DESCRIPTION OF A PREFERRED EMBODIMENT

Figure 1:
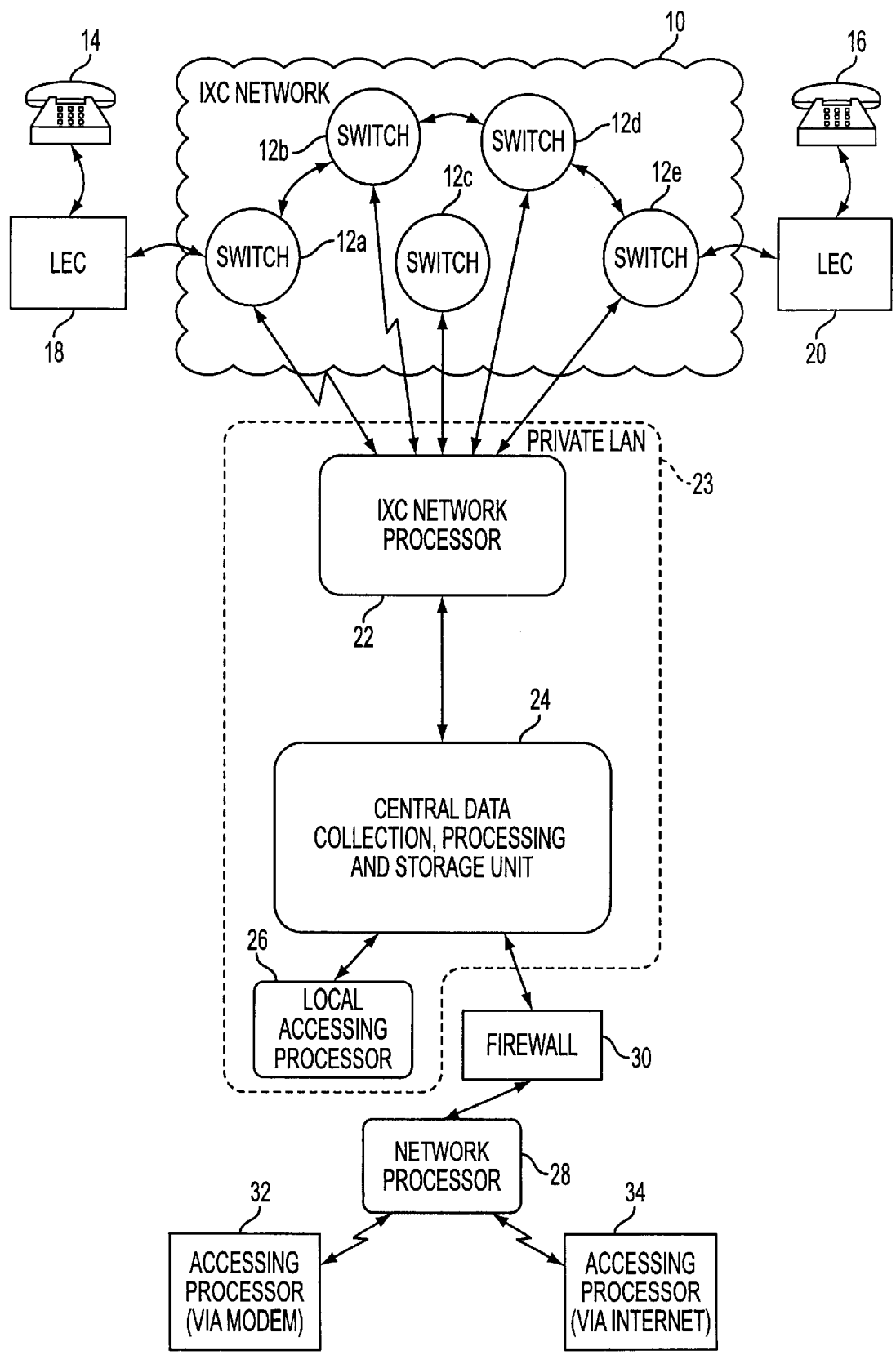
FIG. 1 is a block diagram of an internet accessible system, embodying features of the present invention, for on-line monitoring of a telecommunication network on either a network or switch basis.

Turning now to the drawings, in FIG. 1, the reference numeral 10 designates an IXC network 10. The IXC network 10 includes plural switches used to establish connections between originating and destination terminals. As disclosed herein, the IXC network 10 is illustrated as including first, second, third, fourth and fifth switching nodes 12a, 12b, 12c, 12d and 12e. The disclosure of the IXC network 10 as including five switching nodes is purely exemplary. It is fully contemplated, therefore, that the IXC network 10 may include any number of switching nodes. It should be further understood that the IXC network 10 and the switching nodes 12a through 12e have been greatly simplified and that various components thereof have been omitted for ease of illustration.

Voice terminals, for example, for example, telephones 14 and 16, are coupled to the IXC network 10 by respective local exchange carriers (or "LECs") 18 and 20 which, for example, may be respective regional Bell Operating Companies (or "RBOCs"). The switching nodes 12a through 12e, each of which may be, for example, a switch such any switch of the DMS-100 family of switches, directs calls between an originating terminal, for example, the telephone 14, coupled to the IXC network 10 by the LEC 18, and a destination terminal, for example, the telephone 16, coupled to the IXC network 10 by the LEC 20. The DMS-100 family of switches includes the DMS-100, DMS-200, DMS-250, DMS-300, DMS-500, DMS-STP, DMS-CDMA and DMS-MTX switches, all of which are manufactured by Northern Telecom Ltd. of Montreal, Canada.

Of course, while FIG. 1 shows that the connection between the telephone 14 and the telephone 16 is routed through the switch 12a, the switch 12b, the switch 12d and the switch 12e, it should be clearly understood that the illustrated connection is purely exemplary and that a connection between the telephone 14 and the telephone 16 could, depending on a wide variety of factors such as loads, be directed through the IXC network 10 along a variety of paths which may include one or more of the switches 12a through 12e.

Linked to each of the switches 12a through 12e of the IXC network 10 is an IXC network processor 22. In alternate configurations thereof, each of the switches 12a through 12e may be directly linked to the IXC network processor 22 or may be linked to the IXC network processor 22 via a modem. For example, FIG. 1 shows the switches 12a and 12b linked to the IXC network processor 22 via modems while the switches 12c through 12e are directly linked to the IXC network processor 22. As will be more fully described below, the IXC network processor 22 periodically captures selected types of raw information from each of the switches 12a through 12e linked thereto and then transmits the captured raw information to a central data collection, processing and storage unit 24 (hereafter referred to as the "central data processing unit 24") coupled thereto for storage, analysis and trending. While it is contemplated that various computer systems are suitable to perform the data collection and downloading functions of the IXC network processor 22, it is contemplated that a computer system which includes a P5 or faster processor, for example, a 166 MHz AMD K6 processor on which either a TurboLink or a TCP/IP networking protocol has been installed, 48 MB of RAM and 4.0 gigabytes of disk space will be suitable for the uses contemplated herein.

In addition to storing the raw information captured by the IXC network processor 22, the central data processing unit 24 also analyzes and trends the collected information for presentation to users in a readily understandable format. The central data processing unit 24 forms part of a local area network (or "LAN") 23 which also includes the IXC processor 22 and a local accessing processor 26. The LAN 23 is a private network which may only be accessed by processors owned by the manufacturer of the switches 12a through 12e of the IXC network 10. Of course, it is fully contemplated that, in alternate configurations thereof, the private LAN 23 may be a wide area network (or "WAN") or a LAN/WAN combination. As the local accessing processor 26 is part of the private LAN 23 operated by the manufacturer of the switches 12a through 12e, the collected switch information which is processed by the central data processing unit 24 may be reviewed by an operator of the local accessing processor 26 or other processor (not shown) forming part of the private LAN 23. It is contemplated that the operator of the local accessing processor 22 may monitor the IXC network 10 or a selected switch thereof in a manner similar to that more fully described below by reviewing either raw information captured and maintained by and/or processed information analyzed or trended and maintained by the central data processing unit 24 on either a switch or network basis. Alternately, the operator of the local accessing processor 26, as part of the private LAN 23, may directly access a selected switch 12a through 12e of the IXC network 10, again using either the TurboLink or TCP/IP network protocol.

To enable on-line monitoring of the IXC network 10 from the internet or other location outside the private LAN, the information collected and processed by the central data processing unit 24 in connection with the disclosed method of on-line monitoring of the IXC network 10, the central data processing unit provides a copy of the collected and processed information related to the switches 12a through 12e to a network processor 28 located outside the private LAN 23. By the term "network processor", it is intended to refer to a processor on which a WWW interface has been installed, thereby enabling the network processor 28 to be accessed from outside of the private LAN 23. Thus, the captured and processed information related to the switches 12a through 12e may be reviewed by an operator of an accessing processor, for example, accessing processor 32 or accessing processor 34. For example, using a modem connection, the operator of the accessing processor 32 may dial-up the network processor 28 and, upon confirmation that the operator of the accessing processor 32 is an authorized user, the network processor 28 may grant the accessing processor 32 with access to the collected and processed information provided thereto by the central data processing unit 24. Conversely, the operator of the accessing processor 34 may provide its internet service provider (or "ISP") with the internet protocol (or "IP") address for the network processor. Upon authentication of the operator of the accessing processor 34, the network processor 28 will grant the operator access to the collected and processed information provided by the central data processing unit 24. Finally, the central data processing unit 24 and the network processor 28 are separated by a conventionally designed firewall 30 which prevents accessing processors from outside the private LAN 23, for example, the accessing processors 32 and 34, from gaining direct access to the central data processing unit 24. Thus, while both raw and processed data is available for review by an IXC service provider or other authorized operator via the accessing processors 32 or 34, the firewall 30 prevents the authorized user from accessing the central data processing unit 24, other devices forming part of the private LAN 26 or the switches 12a through 12e of the IXC network 10, except via request which is handled by the network processor 28. Thus, the firewall 30 protects the proprietary information of the manufacturer of the switches 12a through 12e which resides within the switches 12a through 12e or elsewhere within the private LAN 23.

Figure 2A:
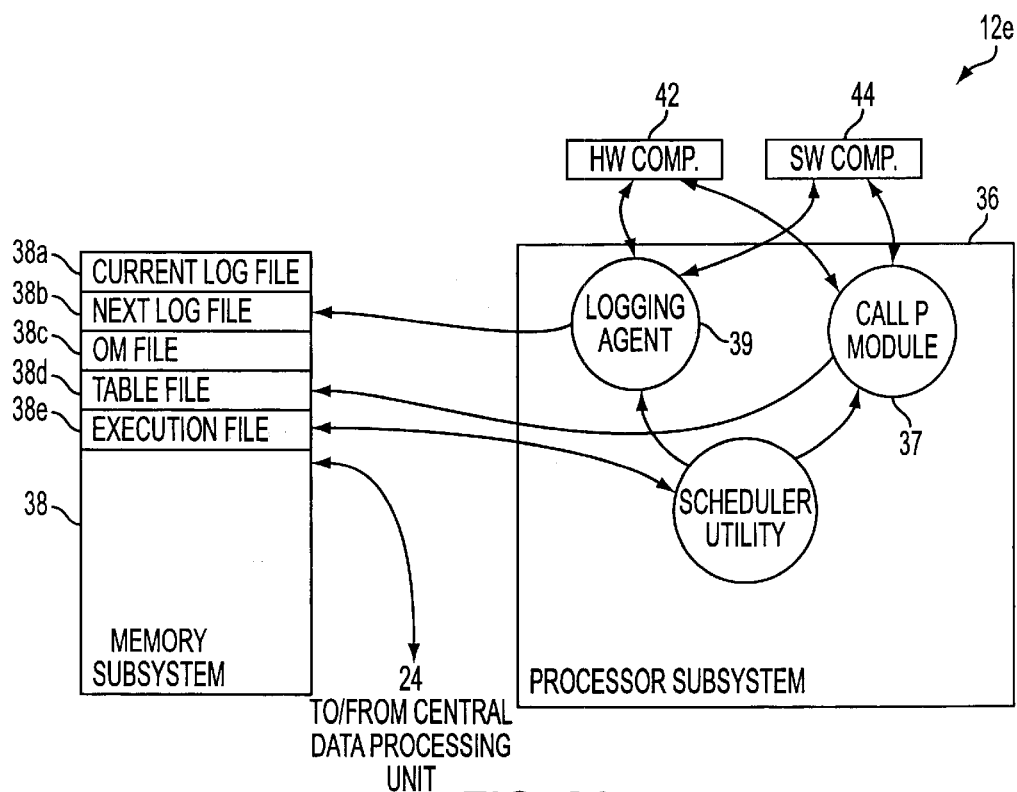
FIG. 2a is an expanded block diagram of a switch of the telecommunication network of FIG. 1.

Referring next to FIG. 2a, one of the switches, for example, the switch 12e of the IXC network 10 shall now be described in greater detail. Of course, it should be clearly understood that the foregoing description of the switch 12e has been greatly simplified for ease of description. As may now be seen, the switch 12c includes a processor subsystem 36 and a memory subsystem 38. The switch 12e further includes a variety of hardware (or "HW") and software (or "SW") components which perform various ones of the functions of the switch 12c. While the switch 12e includes multiple HW and SW components, in FIG. 2a, a single HIW component 42 and a single SW component 44 are shown by way of illustration. Furthermore, while FIG. 2a, shows the HW and SW components 42 and 44 as discrete elements, it should be clearly understood that, depending on the identity of a particular component, it may, in fact, reside within either one of the processor and memory subsystems 36 and 38. For example, a SW component may be a software module which resides on, and is executable by, the processor subsystem 36.

Residing on the processor subsystem are plural software modules. A call processing (or "CALLP") module 37 is a software module which performs a variety of call processing operations such as call set-up where the switch 12e participates in the establishment of a connection between an originating terminal, for example, the voice terminal 14, coupled to the switch 12e by the LEC 18, the switch 12a, the switch 12b and the switch 12d and a destination terminal, for example, the voice terminal 16 coupled to the switch 12e by the LEC 20. As will be more fully described below, the CALLP module 37 may also collect information regarding operation of the switch 12e by executing selected C1 commands. Also residing at the processor subsystem 36 is a logging agent 39 and a scheduler utility 40. The logging agent 39 collects information from the HW and SW components 42 and 44 for storage at selected locations within the memory subsystem 38. The scheduler utility 40 is a software application which defines at which times execution files, stored in the memory subsystem 38 will run, thereby initiating the collection of information by the CALLP module 37 and the logging agent 39.

The memory subsystem 38 includes plural memory areas. In memory areas 38a and 38b, first (or "current") and second (or "next") log files of logging information respectively collected by the logging agent 39 during first and second time periods are maintained. Office management (or "OM") and office engineering table data collected by execution of selected C1 commands by the CALLP module 37 are stored in third and fourth memory areas 38c and 38d, respectively. Finally, execution files which instruct the CALLP module 37 and the logging agent 39 to collect information are stored in memory area 38e until run by the scheduler utility 40.

The office engineering tables which are captured allow authorized operators to search office parms on a network basis. In addition, hardware inventory tables are collected. For all switches of the DMS-100 family, the following office engineering tables are captured by the CALLP module 37 and stored in the fourth area 38d of the memory subsystem 38:

| ANNMEMS | ANNS | APCDINV | APINV | BSCMAP |
|---------|------|---------|-------|--------|
| C7GTT | C7GTTYPE | C7LINK | C7CLKSET | C7LOCSSEN |
| DIRPSSYS | DRAMS | DRAMYTRK | DRAMAPPL | ENCDINV |
| ENINV | FPDEVINV | PRDIPINV | GASINFO | IOC |
| IPHOST | IPNTWRK | IPROUTER | LIMCDINV | LIMINV |
| LIUINV | LTCINV | PTCPSINV | MPC | MPCLINK |
| MSCDINV | MSILINV | MTD | OFCENG | OFCOPT |
| OFCSTD | OFCVAR | RASLAPPL | RMCONFIG | SUSHELF |
| SYNCLK | TERMDEV | TMINV | TRKGRP | TRKSGROUP |

In addition, DMS-100 switches will also capture the following office engineering tables:

| RDTINV | SITE | | | |
|--------|------|--|--|--| while DMS-CDMA switches will also capture the following office engineering tables:

| CDMACELL | CDMACONF | CDMAPART | MSACON | SBSINV |
|----------|----------|----------|--------|--------|

As will be more fully described below, office engineering table data is later transferred from the memory subsystem 38 at a site to the central data processing unit 24 and the network processor 28 where the captured office engineering table data is made available for viewing.

Figure 2B:
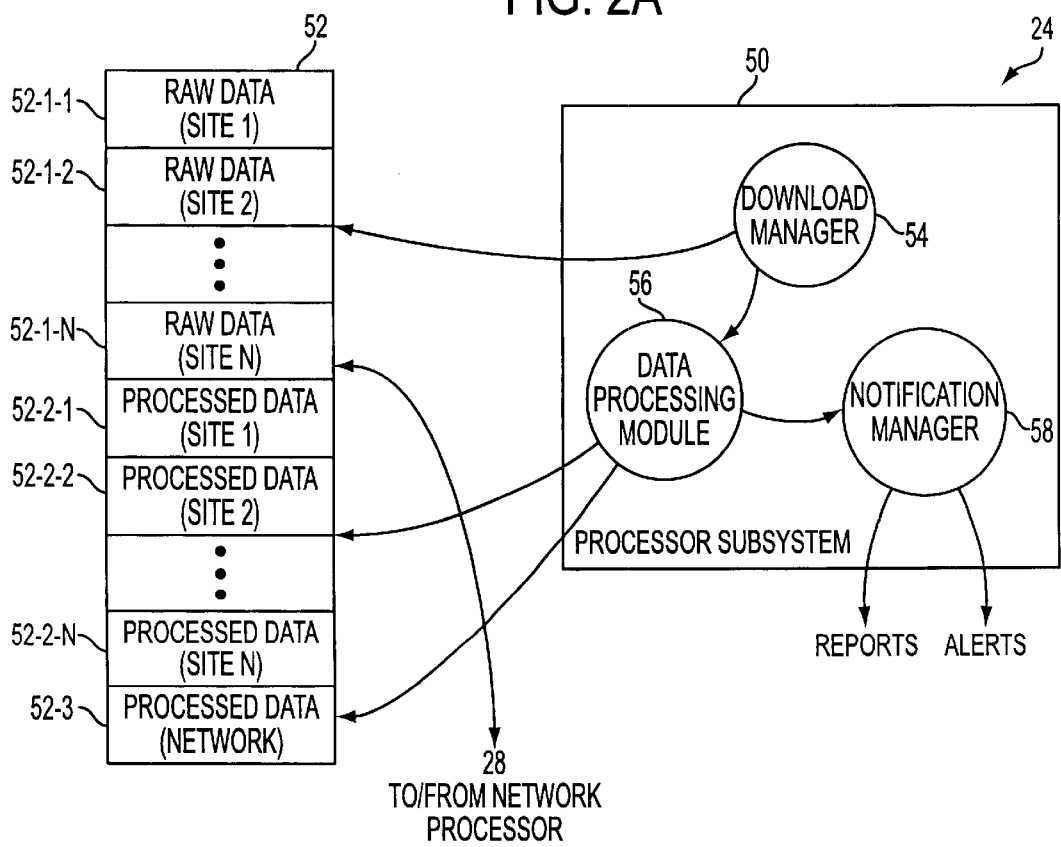
FIG. 2b is an expanded block diagram of a central processing system of the on-line monitoring system of FIG. 1.

Referring next to FIG. 2b, the central data processing unit 24 will now be described in greater detail. Again, it should be clearly understood that the foregoing description of the central data processing unit 24 has been greatly simplified for ease of description. The central data processing unit 24 includes a processor subsystem 50 and a memory subsystem 52. Preferably, the processor subsystem 50 should be a multiple CPU system on which the Oracle WebServer platform resides while the memory subsystem 52 should be a redundant disk array. Residing on the processor subsystem 50 are a download manager 54, a data processor module 56 and an notification manager 58. The download manager 54 handles the information regarding the IXC network 10 collected by the IXC network processor 22 and downloaded to the central data processing unit 24. Upon receiving collected information, the download manager 54 will selectively transfer the raw information to the memory subsystem 52 for storage and/or to the data processing module 56 for processing. Upon receipt of collected information from the download manager 54, the data processing module 56 will execute various processing algorithms using the collected information. Among these will include using log counts from each switch 12a through 12e to determine log counts on a network basis, graphing log counts for either a switch or the network over time, trending the collected information, detecting the occurrence of events for which notifications should be generated and processing the C1 information to evaluate call processing operations for the telecommunications network 10. Finally, upon receipt of a notification from the data processing module 56, the notification manager 58 generates alerts and other reports regarding events occurring within the telecommunications network 10 and/or at one of the switches 12a through 12e thereof and E-Mails the alert and other reports to a pre-selected list of recipients. While not shown in FIG. 2b, the processor subsystem 50 also includes a software module which receives requests, for example, a request by the network processor 28, relayed from the accessing processor 28, to run another tool which resides on the switch 12e. Such requests will be handled by various components of the Oracle WebServer residing at the processor subsystem 36.

Figure 3:
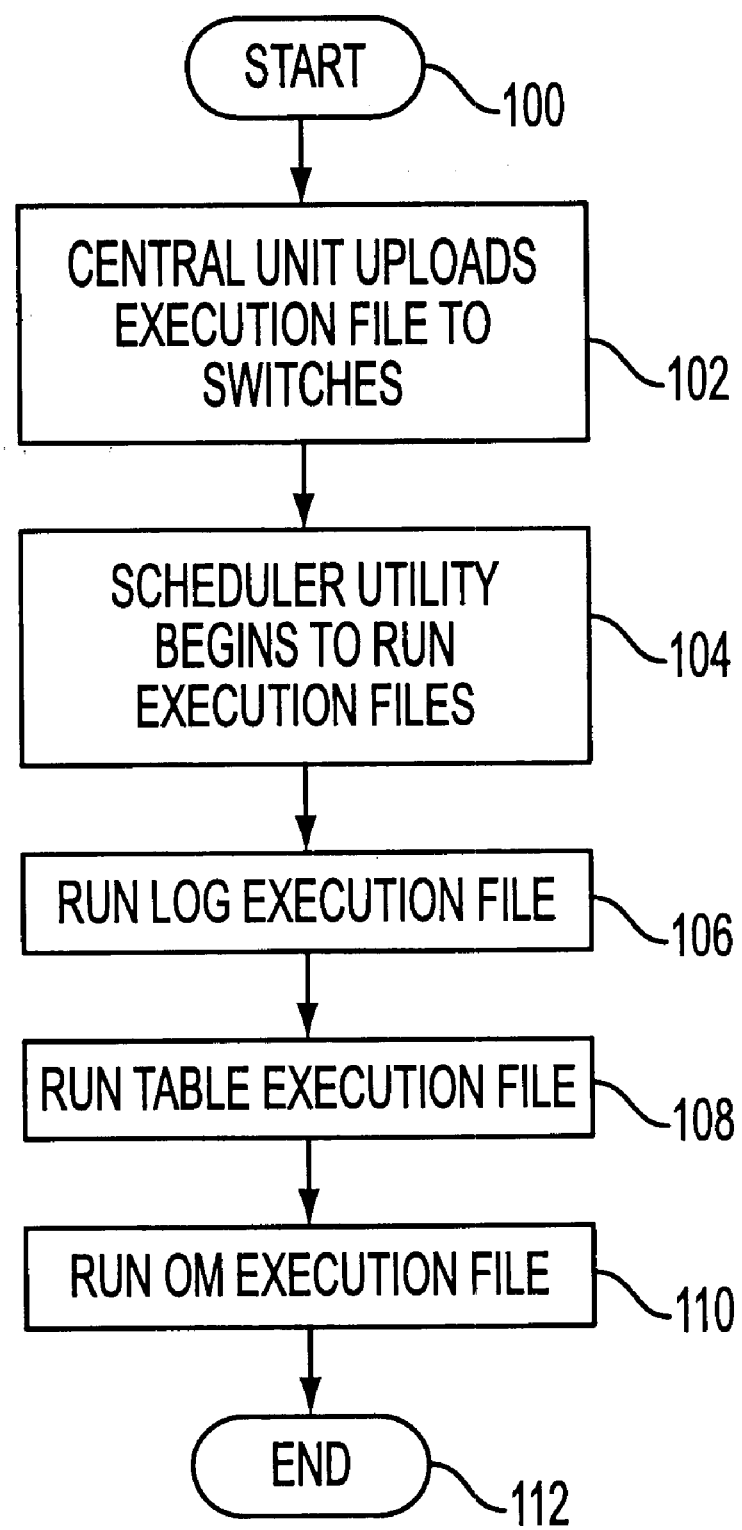
FIG. 3 is a flow chart of a method of collecting data from a requested switch for use during on-line monitoring of a telecommunication network on either a network or switch basis.
Figure 4:
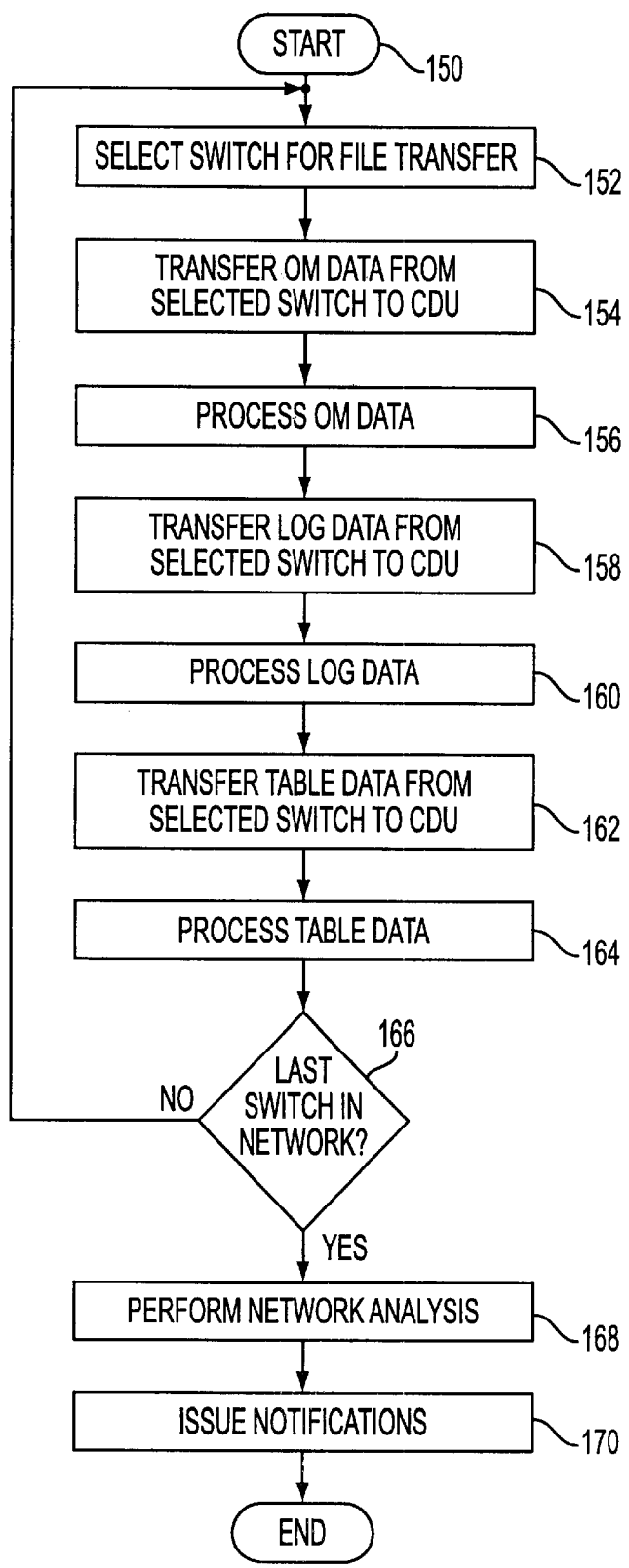
FIG. 4 is a flow chart of a method of processing data collected from the plural switches which comprise the telecommunications network of FIG. 1.

Referring next to FIGS. 3–4, a method of collecting, processing and storing information related to a switch, for example, the switch 12e, such that the information will be accessible for on-line monitoring of the switch on either a switch or network basis shall now be described in greater detail. Prior to commencement of the collection, processing and monitoring of information, the system performing these functions must be initialized to handle the selected switch 12e. More specifically, the central data processing unit 24 must be provided with identifying information, for example, the ftran id, which uniquely identifies the switch to be monitored, E-Mail addresses for one or more designated recipients to which network summary reports, notifications of critical events and site data request approvals are to be E-mailed. If only OMs are to be captured or if call processing productivity reports (or "CPPRs") are to be run, the needed OMs must be defined and assigned to a class. Finally, if extended peripheral module (or "XPM") information is to be processed, OFCVAR parms XPMOCC CP_CONTROL and XPMOVLD_CP_COLNTROL must be set to "Y" and OM groups XPMOCC and XPMOVLD must be captured.

Finally, if necessary, the switch 12e must be prepared for X.25 and Turbolink accesses. Hardware requirements at the switch 12e in order to run Turbolink include the following: an available IOC slot, an IX89 card, a 9600 baud modem and a phone line. Finally, the scheduler utility 40 must be installed at the switch 12e.

Once the switch 12e has been properly prepared, data collection at the site may be initiated. In the disclosed example, it is presumed that each of the switches 12a through 12e have been prepared for data collection. It is fully contemplated, however, that data collection could be limited to selected ones of the switches 12a through 12e. It should also be noted that, as previously set forth, the information to be collected from the selected site or sites includes log data which, heretofore, has been continuously collected by the respective ones of the switches 12a through 12e for local examination. For example, as is typical in the art, the processor subsystem 36 of the switch 12e maintains on the order of about 4,000 logs, each containing information regarding the operation of various ones of the hardware and software components 42 and 44 of the switch 12e. Thus, as the present process commences, the retrieval and storage of log data is an ongoing operation.

Turning specifically to FIG. 3, the method commences at step 100 and, at step 102, the central data processor unit 24 initiates an upload of plural execution files to each of the switches 12a through 12e via the IXC network processor 22. Preferably, the upload is accomplished using a suitable file transfer technique such as the X.25 protocol. Each execution file contains a series of command is which will enable designated data types to be captured at the switch 12a through 12e where the file is run. It is contemplated that the execution files should be periodically re-uploaded to each of the switches 12a through 12e, for example, once every twenty-hours, so that any execution files which are inadvertently deleted or otherwise corrupted will be replaced and to update any additions and/or deletions to the data types to be captured from the switch 12e.

Upon receipt thereof, the switch 12e stores the execution files in the fifth area 38e of the memory subsystem 38. Proceeding to step 104, the scheduler utility 40 begins to run at a preselected time. The scheduler utility 40 selects the execution files stored in the fifth memory area 38e and runs the selected execution files. At step 106, the scheduler utility 40 runs a log execution file. When run by the scheduler utility 40, the log execution file instructs the logging agent 39 to stop placing logged data in the current log file stored in the first memory area 38a and to begin placing any additional logged data in the next log file stored in the second memory area 38b. The log execution file then compresses the current logged data maintained in the first memory area 38a in preparation for download to the central data processing unit 24 via the IXC network processor 22.

After the log execution file has been run to completion, the method proceeds to step 108 where the scheduler utility 40 runs a table execution file which is also stored in the fifth area 38e of the memory subsystem 38. The table execution file is a collection of C1 commands which respectively instruct the switch 12e to collect selected types of user configuration data. All of the C1 commands forming part of the table execution file are existing commands which are recognizable by the CALLP module 37 of the switch 12e. When the scheduler utility 40 executes the table execution file, it issues the C1 commands contained therein to the CALLP module 37. In response, the CALLP module 37 will collect the requested information from the hardware and software components 42 and 44 of the switch 12e. In addition, OFCENG, OFCVAR, OFCSTD and OFCOPT office engineering tables, DMSMON information, Patcher/PRSM lists and MMINFO, CM and MS IDPROM data are collected when the office engineering table execution file is run. When collected, the information, hereafter referred to as "table data", is placed into the table file stored in the fourth memory area 38*d* of the memory subsystem 38. The table execution file then compresses the collected table data maintained in the table file stored in the fourth memory area 38*d* in preparation for download to the central data processing unit 24 via the IXC network processor 22.

After the table execution file has been run to completion, the method proceeds to step 110 where the OM execution file is run. The OM execution file is a collection of OMSHOW commands which collect OM data from the switch 12*c*. While the operator may select which OMs are to be captured, in order to generate CPPR reports, the following OMs are required:

| CP | SYSPERF | OFZ |
|---|---|---|
| NMC | ENETPLNK* | ISUPCONN |
| PMTYP* | PMOVLD* | ISUPCONN |
| C7RTESET* | TRK* | UTR* |
| DSICARR* | RCVR* | TONES* |
| ANN* | TRMTFR | TRMTCM |
| TRMTRS | TRMTER | TRMTCU |
| TRMTCU2 | | | where: * = Totals only.

When collected, the OM information is solaced into OM file stored in the third memory area 38*c*. The OM execution file then compresses the collected OM data maintained in the OM file stored in the third memory area 38*c*, again in preparation for download to the central data processing unit 24 via the IXC network processor 22. The method of data collection at the switch 12*e* then ends at step 112.

Referring next to FIG. 4, the method of collecting and processing information at the central data processing unit 24 will now be described in greater detail. The method commences at step 150 and, at step 152, a switch is selected for download of information collected thereat. For example, the switch 12*e* may be selected for file transfer. Upon selection of a site, the method proceeds to step 152 where OM data contained in the OM file is transferred from the site to the central unit 24. Upon receipt of the OM data by the download manager 54 of the central unit 24, a copy of the received raw data is transferred to a selected area of the memory subsystem 52. For example, if the selected site is the first site from which data is downloaded, a copy of the received raw data would be placed in memory area 52-1-1 of the memory subsystem 52. Proceeding on to step 156, the download manager 54 transfers a copy of selected portions of the received raw data to the data processing module 56 where selected data from the OM file would be processed and the processed data stored in the memory area 52-2-1 of the memory subsystem 52.

Continuing on to step 158, log data would the be downloaded to the central data processing unit 24 from the switch 12*e*, again, using a conventional file transfer protocol. Depending on which log file was previously downloaded to the central data processing unit 24, the downloaded log data would be the other one of the two log files maintained by the memory subsystem 38. Thus, in successive downloads, the transferred log file would be the current log file maintained in the first memory area 38*a* of the memory subsystem 38 and the next log file maintained in the second memory area 38*b* of the memory subsystem 38. Proceeding on to step 158, the download manager 54 of the processor subsystem 50 would transfer a copy of the downloaded raw log data to the second area 52-1-2 of the memory subsystem 52 and, at step 160, a copy of selected portions of the raw log data would be transferred to the data processing module 56 where the selected raw log data would be processed. The processed log data would also be stored in the area 52-1-2 of the memory subsystem 52.

Proceeding on to step 162, table data contained in the table file maintained in the area 38*d* of the memory subsystem 38 of the site would then be downloaded to the central data processing unit 24 from the selected site, once again, using a conventional file transfer protocol. Upon receiving the downloaded table data, the download manager 54 of the processor subsystem 50 transfers a copy of the downloaded table data to the first memory area 52-1-1 of the memory subsystem 52 and, at step 164, a copy of selected portions of the table data is transferred to the data processing module 56 where the selected table data would be processed and the processed data would also be stored in the memory area 52-2-1 of the memory subsystem 52.

At step 166, the central unit 24 determines if information has been downloaded for all of the sites within the telecommunications network 10. If information has not yet been downloaded from all of the sites within the telecommunication network 10, the method returns to step 152 where a next switch is selected as the next site for download and of processing of OM, log and table data. If, however, it is determined at step 166 that OM, log and table data have been downloaded for all of the sites within the telecommunications network, the method then proceeds to step 168 where the raw data from each of the sites 1 through N are retrieved by the data processing module for network level analysis. The results of the network level analysis for the telecommunications network 10 is then stored in the area 52-3 of the memory subsystem 52. Having completed the network level analysis of the telecommunications network 10, the central units uploads the raw and processed data for each site and for the network to the network processor 28 where it is made available for viewing and querying authorized operators of the accessing processors 32 and 34. The method then proceeds on to step 170 where notifications to selected operators are issued. Generally, notifications may be comprised of two types: status reports and critical event notifications. As previously set forth, when preparing a site for on-line monitoring, a list of people who are to receive reports is prepared. If the site was part of a multi-site network, when all of the sites have been processed, a network wide summary report is generated and e-mailed to a list of people identified on that list. Additionally, while the logs document the occurrence of selected types of events, certain ones of the logs may be classified as the "critical" events, the occurrence of which will cause he notification manager 58 to issue a notification of the detected critical events to those people identified during initialization of the site as those people identified as those who are to receive notification of critical events. Among the types of events which are typically identified as critical events are EXT (OM) overflows, which indicate software resource overflows, CM or MS problems such as MS SYSB, CM image faults and Rex failures. Finally, the detection of new traps or swers should result in the generation of an event notification.

Heretofore, neither the type of raw data that is collected nor the types of processing which is performed on the collected raw data has been discussed in detail. The primary type of raw data which is collected for storage on a site basis are logs. Broadly speaking, a log is a count of the total number of times an specified type of event has occurred within a selected time period, here, a 24 hour period and the time when the specified event occurred. As previously mentioned, existing switches such as the switches 12a through 12e are presently capable of maintaining over 4,000 logs, each providing a count of a different event. Thus, the raw data areas 52-1-1 through 52-1-N, assigned to switches 1-N, respectively, will include a count of the total number of times that each type of event occurred within the selected time period. For example, Table 1, below, lists the types of logs and log counts which occurred at a switch during a 24 hour period.

TABLE I

SITE000
There were 1 day(s) of available data for the requested 1 day period, containing 108 different types of logs.
Click on select date to go to site log file.

| Log | Description | Date 970908 |
|---|---|---|
| ACG201 | info acg_table_audit | 48 |
| AFT001 | info aft event | 7 |
| AFT002 | info aft informational | 9 |
| AFT003 | info aft critical alar . . . | 1 |
| AFT004 | info aft critical alar . . . | 1 |
| AMA114 | info file rotation entry | 6 |
| AUD101 | exc letter freed | 5 |
| AUD395 | info ccb dump | 1 |
| AUD396 | info call thread dump | 1 |
| AUD398 | info cdb dump | 1 |
| AUD432 | info eccb dump | 1 |
| AUD433 | info linked tid | 1 |
| AUD700 | info long_dur_call_log | 6 |
| AUD703 | info long_dur_call_aud . . . | 1 |
| AUDT109 | info trunk audit 3 | 17 |
| AUDT111 | info trunk audit 5 | 96 |
| C7UP123 | info rlc not rcvd | 5 |
| CCS101 | flt link failure | 3 |
| CCS102 | info link sync | 3 |
| CCS163 | info link available | 3 |
| CCS164 | flt link unavailable | 3 |
| CCS701 | info mtp static audit | 4 |
| CCS791 | info static data audit . . . | 1 |
| CM100 | summ cm report | 1 |
| CM101 | info cm status | 7 |
| CM107 | tbl mc status change syslog | 2 |
| CM108 | rts mc status change | 2 |
| CM117 | info image test passed | 1 |
| CM124 | info cpu pass | 2 |
| CM130 | info ssc status change | 4 |
| CM144 | info ssc route switch | 2 |
| CM150 | info cm sync complete | 2 |
| CM159 | info cm status change | 2 |
| CM179 | info cm rex generic re . . . | 1 |
| DAIS297 | info abort event | 2 |
| DCR100 | info | 1 |
| DCR101 | info dcr_mode_change | 1 |
| DDM102 | flt | 1 |
| DDU101 | info io error | 1 |
| DFIL301 | info outgoing cic data . . . | 2 |
| DIRP101 | info dirp_flow_log | 196 |
| ECTS105 | info network fabric re . . . | 1 |
| ENCP101 | info enet single ended . . . | 20 |
| ENCP103 | info enet integrity audit | 25 |
| ENET100 | rts | 3 |
| ENET103 | sysb | 3 |
| ENET113 | pass enet system recovery | 3 |
| ENET223 | info enet ripple open | 1 |
| ENET303 | sysb | 2 |
| ENET308 | info | 6 |
| ENET312 | info enet pside link r . . . | 3 |
| ENET314 | info enet pside link a . . . | 2 |
| ENET403 | info enet reference li . . . | 6 |
| ENET503 | info enet rex test sta . . . | 1 |

TABLE I-continued

SITE000
There were 1 day(s) of available data for the requested 1 day period, containing 108 different types of logs.
Click on select date to go to site log file.

| Log | Description | Date 970908 |
|---|---|---|
| ENET504 | pass enet rex test passed | 1 |
| ENET510 | info enet node rex test | 3 |
| ENET511 | pass enet node rex test | 3 |
| ENET520 | info enet matrix rex test | 1 |
| ENET521 | pass enet matrix rex test | 1 |
| FTS300 | tbl file transfer error | 1 |
| FTS600 | info file download | 14 |
| FTS601 | info file upload | 12 |
| IOAU112 | info rex scheduler notice | 2 |
| IOD115 | info | 3 |
| IOD209 | tran | 93 |
| ISDN105 | flt pra sync loss | 1 |
| ISDN112 | info pra d-channel cri . . . | 1 |
| ISDN117 | info invalid_msg_content | 2 |
| ISDN118 | info pra sync established | 1 |
| MFC100 | info soft fault | 1 |
| MFC110 | info recovery | 1 |
| MPC101 | info mpc_information_r . . . | 1 |
| MS104 | info node | 5 |
| MS248 | info system card | 3 |
| MS300 | rts port state ch . . . | 3 |
| MS303 | sysb port state ch . . . | 3 |
| MS307 | info port | 16 |
| MS313 | sysb chnl link port st . . . | 1 |
| MS317 | info chnl link port | 2 |
| MS320 | rts imsl port state c . . . | 1 |
| MS323 | sysb imsl port state c . . . | 1 |
| MS404 | sysb fbus state ch . . . | 1 |
| MS407 | info fbus | 4 |
| MTS103 | info lost data | 59 |
| NOPT101 | info nc state change | 1 |
| OCC240 | info isdn pri exception | 197 |
| PM106 | rts | 164 |
| PM120 | info pp_error_counters | 1 |
| PM126 | info pp-misc-tbl | 3 |
| PM128 | tbl istb | 265 |
| PM181 | info | 241 |
| PM183 | sysb | 5 |
| PM184 | rts | 11 |
| PM189 | info pm sw information . . . | 657 |
| PRSM400 | info command summary | 57 |
| PRSM470 | info status audit summary | 2 |
| PRSM680 | info automated process . . . | 4 |
| RO101 | info session logon | 11 |
| RO102 | info session logoff | 10 |
| RO104 | info abnormal termination | 1 |
| SOC400 | summ soc option audit . . . | 1 |
| SOS101 | info dump complete | 1 |
| SOS102 | info | 2 |
| STR250 | info blue box fraud re . . . | 1 |
| SWER | software error | 7 |
| TELN100 | info telnet connection. | 42 |
| TELN110 | info telnet dis-connec . . . | 42 |
| TRK882 | info group info | 58 |
| | Total Log Types | 108 |
| | Total Logs Found | 2555 |

Table I is, in fact, a reproduction of a GUI generated by the network processor 28 using raw and processed data received from the central data processing unit 24. For this reason, in addition to raw log data, Table I also includes certain processed data for the site, i.e. the total number of different log types detected during the selected time period and the total number of logs (all types) detected during the selected time period. Finally, Table I contains buttons which enable an authorized operator to better review the raw log data. Specifically, by selecting a date appearing in the table, the operator will be transferred to the site log file which will contain raw log data for the selected day.

As previously stated, the acquisition of raw data at each site occurs periodically, typically, once every 24 hours. If the log data set forth in Table I was initially stored in the current log file maintained in area 38*a* of the memory subsystem 38, the log data collected in the next 24 hours would be stored in the next log file maintained in area 38*b* of the memory subsystem 38. When further acquisition of log data occurs, for example, when the raw data contained in the next log file is transferred to the central unit 24 for storage and processing, the newly collected raw log data is merely appended to the existing raw data while the processed log data (total log types detected and total logs (all types) detected) is updated. Of course, while the collected logs are downloaded once a day, log capture frequency may be selected by the operator. Generally, logs counts are stored in the memory subsystem 52 for a period of one year. Alternately, the logs captured may be the full set of logs or a subset thereof. Generally, disk storage available at the switch and the selected log capture frequency will determine whether a full set collection of the logs is possible.

Of the various logs captured during a selected time period, certain ones of the logs are classified as "critical" logs to be specially handled when detected. Traps, which are counted in log CM190, and SWERS, which are counted in log SWER are analyzed by the central data processing unit 24 for both trending and reporting. A daily report which identifies the number of occurrences of each type of trap or swer and the switch(es) where such traps or swers occurred is generated by the data processing module 56 and transmitted to the designated recipients by the notification manager 58. By trending and reporting traps and swers, suspect patches may be monitored for proactive action. Other critical logs which are monitored, trended and captured include mismatch logs, SLM logs, MS logs, integrity logs and sync logs. By monitoring critical logs, proactive action may be taken to prevent service disruptions, overall switch or network health is monitored and hardware and/or software upgrades may be trended and monitored.

If the data processing module 56 detects a first occurrence of a new trap or swer, the data processing module 56 instructs the notification manager 58 to transmit an E-Mail message to the designated recipients which reports the occurrence of the new trap or swer. E-Mail notifications are similarly generated for key system events such as restarts, CM faults, MS faults and SYNC clock problems.

OMs are captured for a 24 hour period and made available for viewing. Like logs, OMs are archived for a period of years. Certain OMs are also deemed critical. For example, if the data processing module 56 detects an EXT overflow, the notification manager will report the overflow condition. Further acquisition of OM and table data is handled differently. Specifically, when new OM and table data is acquired, for example, by capturing the contents of the OM and table files during the next 24 hour period, the download manager 54 merely overwrites the OM and table data acquired during the prior data acquisition period with the OM and table data acquired during the current data acquisition period.

Finally, it should be noted that, in describing the storage of raw and processed data, the memory subsystem 52 was described as a series of memory areas, each of which holds a type of raw or processed data for an indicated site or network. It should be clearly understood that the foregoing is a simplified description of the organization of the memory subsystem 52. When stored in memory, data, whether raw or processed, is written to a selected address or addresses which defines a contiguous block or blocks of available space. There is, however, no requirement that the available blocks of space to which raw or processed data is written reside within a single area of the memory subsystem 52. Instead, the blocks of available space to which raw or processed data for a site is written may be spread throughout the memory subsystem 52 so long as the address for each such block is maintained by the processor subsystem 50 for use in retrieving the data.

Figure 5:
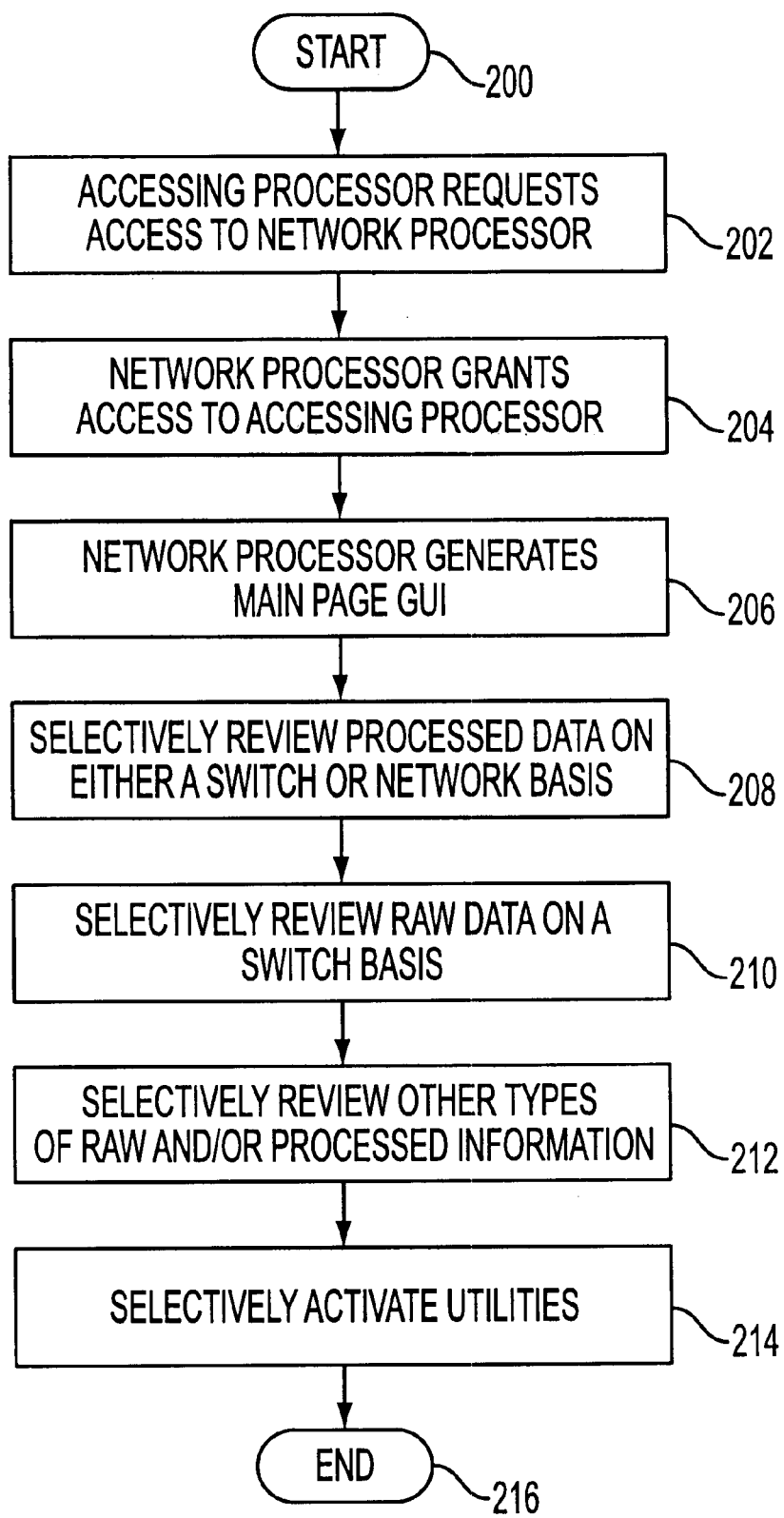
FIG. 5 is a flow chart of a method of on-line monitoring of the data processed by the method of FIG. 4.

Referring next to FIG. 5, a method for on-line monitoring of a selected site, for example, the switch 12*e*, or the telecommunications network 10, by selectively accessing raw or processed information regarding the selected switch or network using a graphical user interface (or "GUI") generated by the network processor 28 will now be described in greater detail. In accordance with the teachings of this method, an authorized operator, for example, a representative or employee of the owner of the telecommunications network 10 and the switches 12*a* through 12*e*, may selectively access raw or processed information regarding a selected one of the switches 12*a* through 12*e* or the telecommunications network 10 itself. As previously described, the central data processing unit 24 receives raw log, OM and table information which is downloaded from each of the switches 12*a* through 12*e*. In addition to storing the raw information on a switch basis, the central unit 24 also processes the collected information on both a switch and a network basis. When processing of the collected information for a selected time period is complete, the central data processing unit 24 transfers the raw switch, processed switch and processed network information to the network processor 28 where it may be reviewed by an authorized operator of the accessing processor 32 or the accessing processor 34.

The method commences at step 200 and, at step 202, an operator of the accessing processor 34 requests access to the network processor 28, for example, by issuing an access request via the internet protocol address for the network processor 28. The method proceeds to step 204 where the network processor 28 determines whether to grant access to the operator of the accessing processor 34. One suitable technique for determining whether to grant access would be to require that the accessing processor 34 to provide a username and password. If the username and password matches that assigned to an authorized user, the method proceeds to step 206 where the network processor generates a "main page" GUI 300 from which the operator located at the accessing processor 34 may review raw or processed information for the telecommunications network 10 or a selected site thereof.

Continuing on to step 208, the operator of the accessing processor 34 may selectively review processed data on either a switch or network basis by accessing the processed data through a reports and graphs section 302 of the main page GUI 300 by selecting a button located therein. At step 210, the operator of the accessing processor 34 may selectively review raw data on a switch basis by accessing the raw data through a site info section 304 of the main page GUI 300 by selecting a button located therein. At step 212, the operator of the accessing processor 34 may selectively review miscellaneous types of raw and/or processed information by accesses through a miscellaneous section 306 of the main page GUI 300 and, at step 214, the operator of the accessing processor 34 may selectively run utilities which may activated through a utilities section 308 of the main page GUI 300. The method then ends at step 216.

Figure 6:
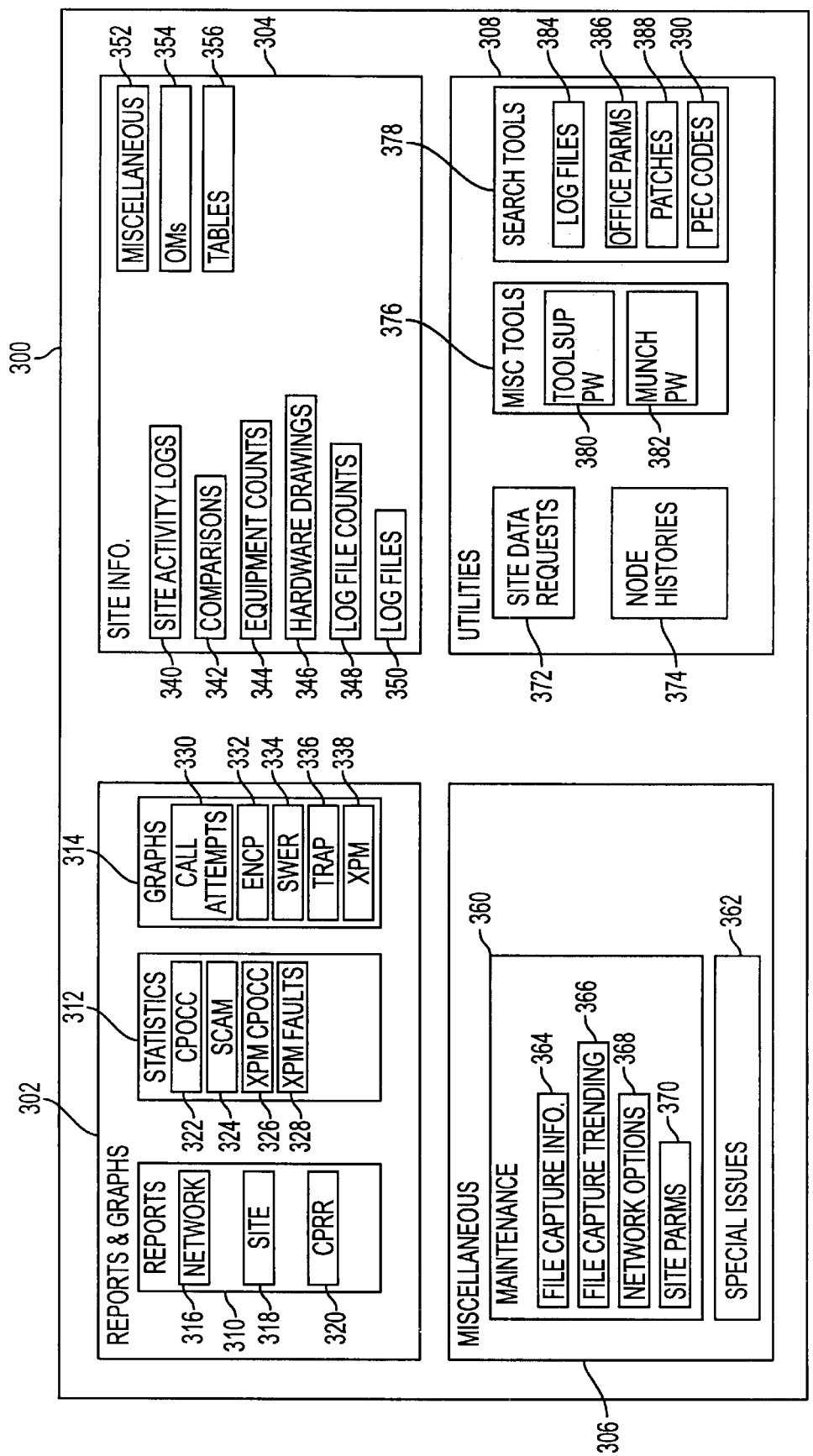
FIG. 6 is a graphical user interface (or "GUI") which may be used to access raw or processed data on either a network or switch basis

Referring next to FIG. 6, the main page GUI 300 may now be seen. As previously set forth, the main page (GUI 300 is comprised of four regions, each related to a type of operation which may be conducted. The regions include a first region 302 from which reports, graphs and/or statistics generated by the central data processing unit 24 may be accessed on either a switch or a network basis, a second region 304 where raw logging, OM and table data acquired by the central data processing unit 24 may be accessed on a switch basis, a third region 306 where maintenance and other miscellaneous information collected by the central data processing unit 24 may be accessed on a switch basis and a fourth region 308 where various utilities and other tools which reside on the central unit 24 may be activated.

As previously set forth, the central data processing unit analyzes collected data on both a switch and a network basis and, from the first region 302, the analysis of the collected data may be accessed. More specifically, the first region 302 is divided into first, second and third subregions 310, 312 and 314. The first subregion 310 provides access to reports generated by the central data processing unit 24, the second subregion 312 provides access to graphs generated by the central data processing unit 24 and the third subregion provides access to statistics generated by the central data processing unit 24.

Within the first subregion 310, a first button 316 provides access to network summary reports, a second button 318 provides access to switch specific reports and a third button 320 provides access to call processing performance reports (or "CPPR reports"). For purposes of the foregoing discussion, it will be presumed that there is a single switch for which the switch specific and CPPR reports may be accessed. Of course, since most telecommunication networks such as the telecommunication network 10 has multiple switches for which reports may be accessed, in such configurations, the second and third buttons 318 and 320 may respectively drill down to a menu which identifies each switch for which switch specific and CPPR reports may be accessed. Alternately, the second and third buttons may be comprised of multiple buttons, one for each switch which may be accessed.

Figure 7:
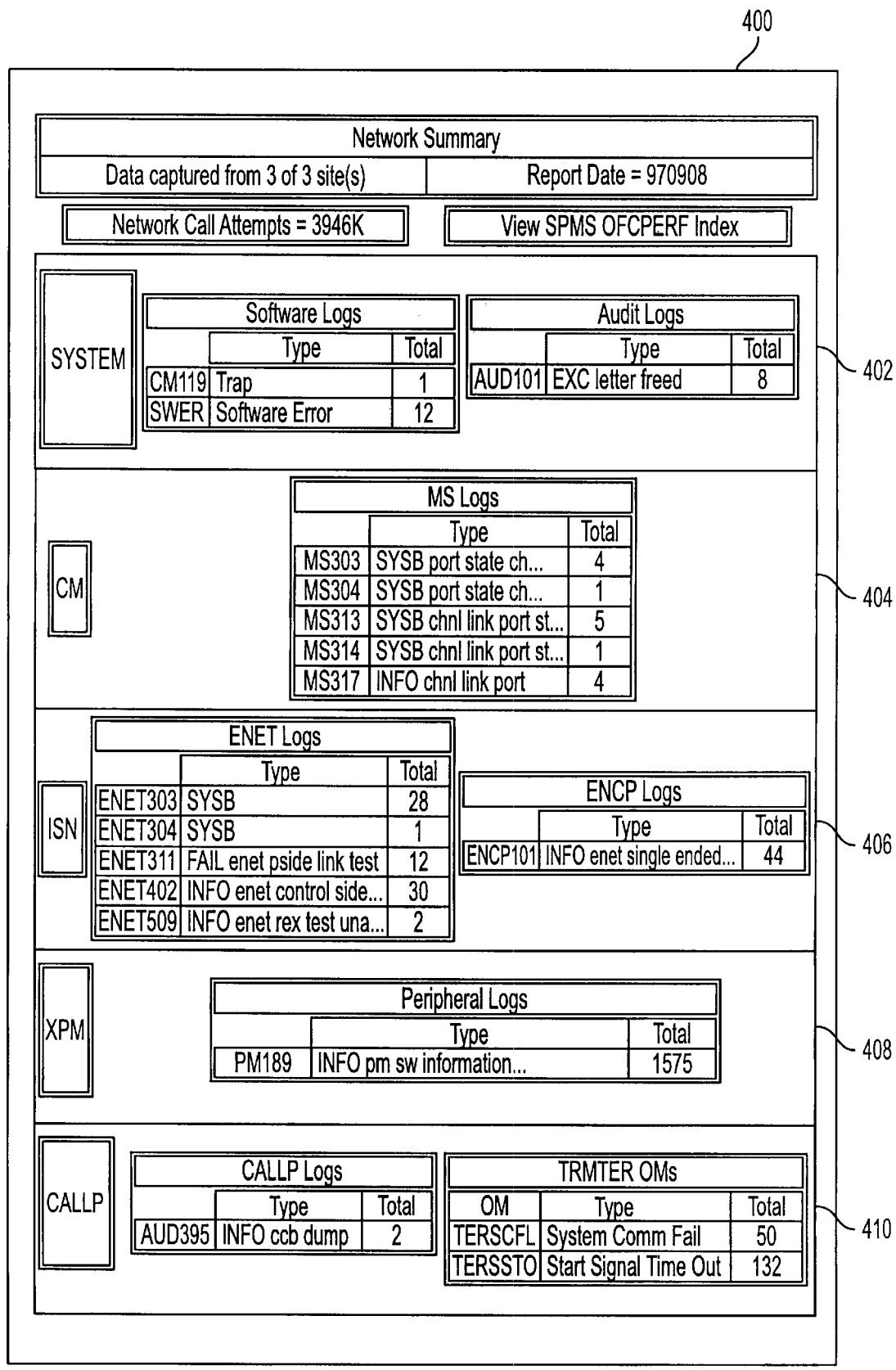
FIG. 7 is a graphical illustration of an analysis of the telecommunications network of FIG. 1 on a network basis.

Referring next to FIG. 7, a network summary report 400 which may be accessed by selecting the button 316 may now be seen. As may now be seen, the network summary report 400 is a collection of critical logs grouped together into various classes. More specifically, the network summary report 400 is comprised of first, second, third, fourth and fifth subsections 402, 404, 406, 408 and 410, which respectively list detected system, CM, ISN XPM and CALLP class logs. System class logs contained in the first subsection 402 include software logs, i.e., traps and swers, and audit logs. CM class logs contained in the second subsection 404 include key system events such as restarts, CM faults, MS faults and SYNC clock problems. ISN class logs contained in the third subsection 406 include key logs which provide node histories which can assist during trouble resolution. XPM class logs contained in the fourth subsection 408 are provided to assist in trouble resolution and include trap and swer counts and switch locations for peripherals affected by traps and/or swers. Included as XPM class logs are the PM185 (PM TRAP) and PM189 (PM SWER) logs. Also include as XPM class logs are XPM SUFs (single unit faults) and XPM DUFs (dual unit faults). Finally, the CALLP logs contained in the fifth subsection 410 tracks critical failures in the ability of the switch to perform call processing functions.

Returning momentarily to FIG. 6, a site report may be accessed by selecting the button 318. In most cases, the site and network reports are similarly configured except that the log counts are for the selected site and not for the entire telecommunications network 10. Finally, a CPPR report for a selected site may be accessed by selecting the button 320. The CPPR report differs from the site reports in that they evaluate call processing health of the site. The CPPR report focuses on issues that the external customer has a direct affect on, for example, translations, T-1 facility problems and SS7 problems, and is generated using raw OMs collected from the selected site. A call processing performance report 500 for a selected site may be seen by reference to FIG. 8. As may now be seen, the CPPR report is divided into traffic data and call impacting events. Traffic data includes various traffic indicators such as call connection rate, call failure rate and total call attempts for the selected site and survey period and an evaluation of each listed indicator. Call impacting events are divided into plural groups of events which include customer controlled evens, switch accessibility events, translations and routing events, data quality events and facility/network events. For each event group, one or more specific type of event, its frequency and an evaluation of the seriousness of its frequency are included.

To generate the CPPR report illustrated in FIG. 8, the following relationships are used:

Call Connection Rate

> Formula: COMP_RATE=(((CONNECT+TFRBUSHY)/INCA-TOT)*100)

Limits: Green 98 to 100%
Yellow 94 to 98%
Red 90 to 94%
Blue 0 to 90%

Call Failure Rate

> Formula: FAIL_RATE=INCATOT/(total of OM pegs for sections A,B&C)

Limits: (Green 90 to 100%
Yellow 80 to 90%
Red 70 to 80%
Blue 0 to 70%

A1—Ineffective Dialing Attempts

> Formula: per 10K=((PRERTEAB+TCMPDIL+TCMPSIG)/INCA-TOT)*1000)

Limits: Green 0 to 300
Yellow 300 to 500
Red 500 to 1000
Blue 1000+

B1—Hardware Network Blockage

> Formula: per 10K=((TRSNBLH+TRSNBLN)/INCATOT)*10000)

Limits: Green 0 to 0.05
Yellow 0.05 to 0.5
Red 0.5 to 1000
Blue 1000+

B2—Switching Equipment Failure (Software)

> Formula: per 10K=((CPSUIC+CPTRAP)/INCATOT)*10000)

Limits: Green 0 to 0.05
Yellow 0.05 to 0.5
Red 0.5 to 1000
Blue 1000+

B3—Provisioned Resource Shortage

Formula: per 10K=(((CCBOVFL+CPLOOVFL+CPLPOVFL+WAITDENY+OUTBOVFL+EXTOVFL+ANNOVFL+PTRMDENY+PORGDENY)/INCATOT)*10000)

Limits: Green 0 to 1
Yellow 1 to 5
Red 5 to 1000
Blue 1000+

B4—Calls Cutoff Due to DTC, NET

Formula: per 10K=((((CINTEGFL+PMTSBTCO+PMTMBTCO)/INCATOT)*10000)

Limits: Green 0 to 0.1
Yellow 0.1 to 0.5
Red 5 to 1000
Blue 1000+

B5—Calls Blocked/Cutoff Due to Restarts

Formula: per 10K=((((CINITC+WINITC+INITDENY)/INCATOT)*10000)

Limits: Green 0 to 0.005
Yellow 0.005 to 0.5
Red 0.5 to 1000
Blue 1000+

C1—Customer Unauthorized Access Denial

Formula: per 10K=(((Total of OM groups TRMTCU & TRMTCU2)/INCATOT)*10000)

Limits: Green 0 to 20
Yellow 20 to 50
Red 50 to 1000
Blue 1000+

C2—Feature Related Access Denial

Formula: per 10K=(((TRMTFR (All except BUSY, CCAP,* CCTO))/INCATOT)*10000)

Limits: Green 0 to 0.005
Yellow 0.005 to 1
Red 1 to 1000
Blue 1000+

C3—Routing Exceptions

Formula: per 10K=(((TRMTCM (all except PDIL & PSIG)+TRMTER (all)/INCATOT)*1000)

Limits: Green 0 to 65
Yellow 65 to 90
Red 90 to 1000
Blue 1000+

C4—No Terminating Resources Available

Formula: per 10K=(((TRMTCM (all except PDIL & PSIG)+TRMTER (all)/INCATOT)*10000)

Limits: Green 0 to 30
Yellow 30 to 60
Red 60 to 1000
Blue 1000+

D1—Switch Integrity Errors

Formula: per 10K=(((NMSPCHER or ENSPCHER)/INCATOT)*10000)

Limits: Green 0 to 0.75
Yellow 0.75 to 5
Red 5 to 1000
Blue 1000+

D2—DS1 Carrier Slips/Loss of Frame

Formula: per 10K=(((DS1SLP+DS1LOF)/INCATOT)*10000)

Limits: Green 0 to 0.75
Yellow 0.75 to 5
Red 5 to 5000
Blue 1000+

E1—PTS Outpulsing Failures (1st attempt)

Formula: per 10K=((OUTOSF/INCATOT)*10000)

Limits: Green 0 to 15
Yellow 15 to 40
Red 40 to 1000
Blue 1000+

E2—IPTS Outpulsing Failures (2nd attempt)

Formula: per 10K=((OUTROSF/INCATOT)*1000tr)

Limits: Green 0 to 4
Yellow 4 to 8
Red 8 to 1000
Blue 1000+

E3—SS7 Terminating Call Failures

Formula: per 10K=(((ISONUCC+ISCONUCO+ISCONUCN+ISCONUCA+ISCONUCE+ISCONUCF+ISCONUO2+ISCONFAR+ISCONUCS+ISCONINR)/INCATOT)*10000)

Limits: Green 0 to 10
Yellow 10 to 25
Red 25 to 1000
Blue 1000+

E4—SS7 Continuity Test Failure rate

Formula: per 10K=((ISCONICC+ISCONIC2+ISCONCOT)*10000)

Limits: Green 0 to 0.2
Yellow 0.2 to 0.5
Red 0.5 to 10
Blue 10+

E5—SS7 Unavailable Routeset Usage

Formula: per 10K=((C7RSUNAU+C7RSCNGU)*10000)

Limits: Green 0 to 2
Yellow 2 to 5
Red 5 to 1000
Blue 1000+

E6—DS1 Carrier Unavailable Usage

Formula: per 10K=((DS1SBU+DS1CBU+PMTMMBU+PMTMSBU)*10000)

Limits: Green 0 to 20
Yellow 20 to 40
Red 40 to 1000
Blue 1000+

Returning momentarily to FIG. 6, statistics may be accessed through the second subregion 312 by selecting one of the first, second, third or fourth buttons 322, 324, 326 or 328. By selecting the first button 322, CPU occupancy (or "CPOCC") is provided for a five minute interval, with samples being taken every minute. Each sample in the five minute period is analyzed. The sample indicating the highest CPOCC is then stored in an internal table which maintains data for 36 hours. By selecting the second button 324, call modeling information collected for the telecommunications network by a customer specific tool know as SCAM may be accessed. For example, DAL to DAL connections, DAL to IMT connections and EANT originations using TCN may be accessed by selecting the second button 312. By selecting the third, XPM CPOCC, button 326, the operator is provided with a clear look at current XPM capacities and is able to identify XPMs that may need to have traffic re-distributed to alleviate overload conditions. Finally, by selecting the fourth, XPM FAULTS, button, the operator may access a list of up to the 25 worst XPMs in the telecommunications network 10 for single unit failures, double unit failures and overloads.

Continuing to refer to FIG. 6, the second region 304 will now be described in greater detail. From this region, site specific information may be accessed. Specifically, the second region 304 includes first, second, third, fourth, fifth, sixth, seventh, eighth and ninth buttons 340, 342, 344, 346, 348, 350, 352, 354 and 356, depression of which will access a specific type of sites specific information. Of course, if the telecommunication network 10 has multiple sites for which site specific information may be accessed, in such configurations, the first through ninth buttons 340 through 356 would respectively drill down to a menu which identifies each site for which site specific information may be accessed. Alternately, the first through ninth buttons 340 through 356 may each be comprised of multiple buttons, one for each site for which site specific information may be accessed.

By selecting the first button 340, site activity logs may be accessed. By selecting the second button 342, site comparisons may be accessed. By selecting the third button 344, equipment counts may be accessed. By selecting the fourth button 346, hardware drawings may be accessed. By selecting the fifth button 348, log file counts may be accessed. By selecting the sixth button 350, log files may be accessed. By selecting the seventh button 352, miscellaneous site information may be accessed. By selecting the eighth button 354, the raw OMs collected at a selected site may be accessed and, by selecting the ninth button 356, the raw table data collected at a selected switch may be accessed.

The third region 306 of the GUI 300 will now be described in greater detail. From this region, miscellaneous types of information may be accessed. Specifically, the third region 306 is comprised of first and second subregions. Maintenance information is maintained in the first subregion 360 while information related to special issues is maintained in the second subregion 362. The first subregion 360 includes first, second, third and fourth buttons 364, 366, 368 and 370, depression of which will access a specific type of maintenance information. Of course, if the telecommunication network 10 has multiple sites for which site specific information may be accessed, in such configurations, the first through fourth buttons 364 through 370 would respectively drill down to a menu which identifies each site for which maintenance information may be accessed. Alternately, the first through fourth buttons 364 through through 370 may each be comprised of multiple buttons, one for each site for which maintenance information may be required.

By selecting the first button 364, file capture information may be accessed. By selecting the second button 366, file capture trending may be accessed. By selecting the third button 368, network options may be accessed and, by selecting the fourth button 370, site parms are collected.

The fourth region 308 of the GUI 300 will now be described in greater detail. From this region, the operator may request that selected utilities that reside at the site be used to perform selected operations. More specifically, the fourth region 308 is comprised of first, second, third and fourth subregions 372, 374, 376 and 378. From the first subregion 372, the operator may issue data requests for a selected site. Specifically, by selecting the first subregion 372, the operator will be presented with a menu which asks the type of data to be collected at a site and which site or sites of the telecommunications network 10 should the selected data type be collected. From the region 374, the operator may access node histories for a selected site. From the region 374, the operator may activate specific tools. For example, by selecting the button 380, the toolsup pw tool is activated and, by selecting the button 382, the munch pw tool may be activated. Again, activation of these tools will include a selection of the site for which the resident tool is to be activated. Finally, from the subregion 378, search tools which also reside at the site may be activated. For example, by selecting the button 386, the log files search tool will be activated. By selecting the button 388, the office parms search tool will be activated. Conversely, by selecting the button 388, a patch tool may be activated while, by selecting the button 390, a PEC code tool may be activated. As each of the aforementioned tools reside at each site for the telecommunications network 10, it is contemplated that, upon selection of any one of the first through fourth buttons 384 through 390, the operator would be asked to select the site for which the selected tool is to be activated.

Although illustrative embodiments of the invention have been shown and described, other modifications, changes, and substitutions are intended in the foregoing disclosure. Accordingly, it is appropriate that the appended claims be construed broadly and in a manner consistent with the scope of the invention.

What is claimed is:

1. A method for monitoring operation of a telecommunications network, the telecommunications network including a first switch having at least one component, and a second switch having at least one component, the second switch being coupled to the first switch, said method comprising the steps of:

collecting data, via at least one software module at the first switch, from the at least one component of the first switch, the data including at least raw log information, configuration information, and operational management information of the first switch;

maintaining, in a memory subsystem at the first switch, the data collected from the at least one component of the first switch;

collecting data, via at least one software module at the second switch, from the at least one component of the second switch, the data including at least raw log information, configuration information, and operational management information of the second switch;

maintaining, in a memory subsystem at the second switch, the data collected from the at least one component of the second switch;

transferring, to a central unit separate from the first and second switches via a first software module in the central unit, the data collected and maintained at the first and second switches;

generating, via a second software module in the central unit and the collected data of the first and second unit, an evaluation of operating conditions at the first and second switches, the evaluation including at least a network log count evaluation produced from raw log information and a call-processing based evaluation produced from the configuration data and the operational management information of the first and second switches;

reviewing, from a remote location separate from said central unit, the data collected and maintained at the first and second switches and transferred to the central unit; and reviewing, from said remote location, the evaluation of operating conditions at the first and second switches, wherein the at least one software module for each one of the first and second switches further includes a first software module for collecting log data and a second software module for collecting call processing data, and wherein for each of the first and second switches, the memory subsystem is coupled to the first and second software modules and the memory subsystem includes a first memory area for maintaining log information and a second memory area for maintaining configuration data.

2. For a telecommunications network comprised of a first switch and a second switch, each of the first and second switches having at least one component, a method for on-line monitoring of the telecommunications network, comprising the steps of:

collecting data, via at least one software module at the first switch, from the at least one component of the first switch, the data including at least raw log information, configuration information, and operational management information of the first switch;

maintaining, in a memory subsystem at the first switch, the data collected from the at least one component of the first switch;

collecting data, via at least one software module at the second switch, from the at least one component of the second switch, the data including at least raw log information, configuration information, and operational management information of the second switch;

maintaining, in a memory subsystem at the second switch, the data collected from the at least one component of the second switch;

transferring, to a central data processing unit separate from the first and second switches via a first software module in the central data processing unit, the data collected and maintained at the first and second switches, respectively;

arranging, via a second software module and a memory subsystem in the central data processing unit, the collected data for each one of the first and second switches into a first data subset containing log information for each one of the first and second switches, respectively, a second data subset containing configuration data for each one of the first and second switches, respectively, and a third data subset containing operational management information for each one of the first and second switches, respectively, the memory subsystem in the central data processing unit having a first memory area for maintaining the first data subset, a second memory area for maintaining the second data subset, and a third memory area for maintaining the third data subset; and reviewing, via an internet connection, the arranged data for the first and second switches, wherein the first switch collecting, first switch maintaining, second switch collecting, second switch maintaining, transferring and arranging steps are machine implemented, wherein the at least one software module for each one of the first and second switches further includes a first software module for collecting log data and a second software module for collecting call processing data, and wherein for each of the first and second switches, the memory subsystem is coupled to the first and second software modules and the memory subsystem includes a first memory area for maintaining log information and a second memory area for maintaining configuration data.

3. For a telecommunications network comprised of a first switch and a second switch, each of the first and second switches having at least one component, a method for on-line monitoring of the telecommunications network comprising the steps of:

collecting data, via at least one software module at the first switch, from the at least one component of the first switch, the data including at least raw log information, configuration information, and operational management information for the first switch;

maintaining, in a memory subsystem at the first switch, the data collected from the at least one component of the first switch;

collecting data, via at least one software module at the second switch, from the at least one component of the second switch, the data including at least raw log information, configuration information, and operational management information of the second switch;

maintaining, in a memory subsystem at the second switch, the data collected from the at least one component of the second switch;

transferring, to a central data processing unit separate from the first and second switches via a first software module in the central data processing unit, the data collected and maintained at the first and second switches, respectively;

arranging, via a second software module and a memory subsystem in the central data processing unit, the collected data for each one of the first and second switches into a first data subset containing log information for each one of the first and second switches, respectively, a second data subset containing configuration data for each one of the first and second switches, respectively, and a third data subset containing operational management information for each one of the first and second switches, respectively, the memory subsystem in the central data processing unit having a first memory area for maintaining the first data subset, a second memory area for maintaining the second data subset, and a third memory area for maintaining the third data subset;

reviewing, via an internet connection, the arranged data for the first and second switches;

generating, via a third software module in the central data processing unit and the collected data for the first and second switches, a first evaluation of the telecommunications network; and reviewing, via the internet connection, the first evaluation of the telecommunications network, wherein the at least one software module for each one of the first and second switches further includes a first software module for collecting log data and a second software module for collecting call processing data, and wherein for each of the first and second switches, the memory subsystem is coupled to the first and second software modules and the memory subsystem includes a first memory area for maintaining log information and a second memory area for maintaining configuration data.

4. The method of claim 3, wherein said first evaluation is a network log count produced from said first data subset containing raw log information for said first and second switches.

5. The method of claim 4, and further comprising the steps of:
generating at said central data processing unit, from said collected data for said first and second switches, a second evaluation of said telecommunications network; and
reviewing, via said internet connection, said second evaluation of said telecommunications network.

6. The method of claim 5, wherein said second evaluation is a call processing-based evaluation produced from said second and third data subsets containing configuration information and operational management information, respectively, for said first and second switches.

7. A telecommunications network, comprising:
a first switch having at least one component;
means, within said first switch, for collecting data from said at least one component of said first switch, the data including at least raw log information, configuration information, and operational management information of said first switch, wherein said collecting means includes at least one software module of said first switch;
means, within said first switch, for maintaining said data collected from said at least one component of said first switch, wherein said maintaining means includes a memory subsystem of said first switch;
a second switch coupled to said first switch, said second switch having at least one component;
means, within said second switch, for collecting data from said at least one component of said second switch, the data including at least raw log information, configuration information, and operational management information of said second switch, wherein said collecting means includes at least one software module of said second switch;
means, within said second switch, for maintaining said data collected from said at least one component of said second switch, wherein said maintaining means includes a memory subsystem of said second switch; and
a central data processing unit separate from said first and second switches, coupled to said first and second switches, said central data processing unit including a first software module for capturing said data collected and maintained within each of said first and second switches and a second software module for generating first and second evaluations of said network from said captured data, the first network evaluation including a network log count produced from the raw log information and the second network evaluation produced from the configuration information and operational management information,
wherein said first and second evaluations of said network are accessible for review by an accessing processor positioned at a remote location relative to said central data processing unit, said accessing processor coupled to said central data processing unit by an internet connection,
wherein for each of said first and second switches, said at least one software module further comprises a first software module for collecting log data and a second software module for collecting call processing data, and
wherein for each of said first and second switches, said memory subsystem is coupled to said first and second software modules and includes a first memory area for maintaining log information and a second memory area for maintaining configuration data.

8. A telecommunications network, comprising:
a first switch having at least one component;
means, within said first switch, for collecting data from said at least one component of said first switch, the data including at least raw log information, configuration information, and operational management information of said first switch, wherein said collecting means includes at least one software module of said first switch;
means, within said first switch, for maintaining said data collected from said at least one component of said first switch, wherein said maintaining means includes a memory subsystem of said first switch;
a second switch coupled to said first switch, said second switch having at least one component;
means, within said second switch, for collecting data from said at least one component of said second switch, the data including at least raw log information, configuration information, and operational management information of said second switch, wherein said collecting means includes at least one software module of said second switch;
means, within said second switch, for maintaining said data collected from said at least one component of said second switch, wherein said maintaining means includes a memory subsystem of said second switch; and
a central data processing unit separate from said first and second switches, coupled to said first and second switches, said central data processing unit including a first software module for capturing said data collected and maintained within each of said first and second switches and a second software module for generating first and second evaluations of said network from said captured data, the first network evaluation including a network log count produced from the raw log information of said first and second switches and the second network evaluation including a call-processing based evaluation produced from the configuration information and operational management information of said first and second switches,
wherein said first and second evaluations of said network are accessible for review by an accessing processor positioned at a remote location relative to said central data processing unit, said accessing processor coupled to said central data processing unit by an internet connection,
wherein said central data processing unit further comprises a third software module for issuing notifications related to said first and second evaluations of said network to designated recipients,
wherein for each of said first and second switches, said at least one software module further comprises a first software module for collecting log data and a second software module for collecting call processing data, and wherein for each of said first and second switches, said memory subsystem is coupled to said first and second software modules and includes a first memory area for maintaining log information and a second memory area for maintaining configuration data.

9. A telecommunications network comprising:
a first switch;
a second switch coupled to said first switch; and
a central data processing unit separate from said first and second switches, coupled to said first and second switches, said central data processing unit including a first software module for capturing data from each of said first and second switches, a second software module for generating first and second evaluations of said network, and a third software module for issuing notifications related to said first and second evaluations to designated recipients;
wherein said first and second evaluations of said network are accessible for review by an accessing processor positioned at a remote location relative to said central data processing unit, said accessing processor coupled to said central data processing unit by an internet connection;
each of said first and second switches further comprising:
a first software module for collecting log data, the log data including at least raw log information of said switch;
a second software module for collecting call processing data, the call processing data including at least configuration information and operational management information of said switch; and
a memory subsystem coupled to said first and second software modules, said memory subsystem having a first memory area for maintaining log information for said switch, a second memory area for maintaining configuration data for said switch and a third memory area for maintaining operational management information for said switch,
further wherein said first network evaluation includes a network log count evaluation produced from the raw log information, and
wherein said second network evaluation includes a call-processing based evaluation produced from the configuration information and operational management information.

10. A telecommunications network according to claim 9 wherein said central data processing unit further comprises a memory subsystem coupled to said first and second software modules, said memory subsystem having a first memory area for maintaining raw data for each one of said first and second switches, a second memory area for maintaining processed data for each one of said first and second switches and a third memory area for maintaining processed data for said telecommunications network.

11. A telecommunications network, comprising:
a first switch;
a second switch coupled to said first switch;
said first switch further comprising at least one software module containing instructions which, when executed, collects data related to at least raw log information, configuration information, and operational management information of said first switch and a memory subsystem, coupled to said at least one software module of said first switch, said memory subsystem of said first switch maintaining said data collected by execution of said instructions of said at least one software module of said first switch;
said second switch further comprising at least one software module containing instructions which, when executed, collects data related to at least raw log information, configuration information, and operational management information of said second switch and a memory subsystem, coupled to said at least one software module of said second switch, said memory subsystem of said second switch maintaining said data collected by execution of said instructions of said at least one software module of said second switch; and
a central data processing unit separate from said first and second switches, coupled to said first and second switches, said central data processing unit including a first software module containing instructions which, when executed, acquires data maintained in said memory subsystem of each of said first and second switches and a second software module containing instructions which, when executed, generates an evaluation of said network from said acquired data, the network evaluation including at least a network log count evaluation produced from the raw log information of said first and second switches and a call-processing based evaluation produced from the configuration information and the operational management information of said first and second switches,
wherein said evaluation of said network is accessible for review by an accessing processor positioned at a remote location relative to said central data processing unit, said accessing processor coupled to said central data processing unit by an internet connections
wherein for each of said first and second switches, said at least one software module further comprises a first software module for collecting log data and a second software module for collecting call processing data, and
wherein for each of said first and second switches, said memory subsystem is coupled to said first and second software modules and includes a first memory area for maintaining log information and a second memory area for maintaining configuration data.

12. A telecommunications network, comprising:
a first switch;
a second switch coupled to said first switch;
said first switch further comprising at least one software module for collecting data related to at least raw log information, configuration information, and operational management information of said first switch and a memory subsystem, coupled to said at least one software module of said first switch, said memory subsystem of said first switch maintaining said data collected by said at least one software module of said first switch;
said second switch further comprising at least one software module for collecting data related to at least raw log information, configuration information, and operational management information of said second switch and a memory subsystem, coupled to said at least one software module of said second switch, said memory subsystem of said second switch maintaining said data collected by said at least one software module of said second switch;
a central data processing unit, separate from said first and second switches, coupled to said first and second switches, said central data processing unit including a first software module for capturing data maintained in said memory subsystem of each of said first and second switches and a second software module for generating an evaluation of said network from said captured data, the evaluation including at least a network log count evaluation produced from the raw log information of said first and second switches and a call-processing based evaluation produced from the configuration information and operational management information of said first and second switches;

wherein said evaluation of said network is accessible for review by an accessing processor positioned at a remote location relative to said central data processing unit, said accessing processor coupled to said central data processing unit by an internet connection;

wherein said at least one software module for each one of said first and second switches further comprises a first software module for collecting log data and a second software module for collecting call processing data; and wherein for each of said first and second switches, said memory subsystem is coupled to said first and second software modules and said memory subsystem includes a first memory area for maintaining log information and a second memory area for maintaining configuration data.

* * * * *